United States Patent
Brooks et al.

(10) Patent No.: US 11,654,800 B2
(45) Date of Patent: May 23, 2023

(54) EASY ENTRANCE/EXIT SYSTEM FOR A VEHICLE

(71) Applicant: Toyota Research Institute, Inc., Los Altos, CA (US)

(72) Inventors: Daniel J. Brooks, Arlington, MA (US); Manuel Ludwig Kuehner, Mountain View, CA (US); Jaime Camhi, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 49 days.

(21) Appl. No.: 17/333,108

(22) Filed: May 28, 2021

(65) Prior Publication Data

US 2022/0379778 A1    Dec. 1, 2022

(51) Int. Cl.
*B60N 2/24*     (2006.01)
*B60N 2/02*     (2006.01)
*B60N 2/16*     (2006.01)
*B60N 2/56*     (2006.01)

(52) U.S. Cl.
CPC .......... *B60N 2/245* (2013.01); *B60N 2/1675* (2013.01); *B60N 2/5635* (2013.01); *B60N 2002/022* (2013.01)

(58) Field of Classification Search
CPC .... B60N 2/245; B60N 2/1675; B60N 2/5635; B60N 2002/022
See application file for complete search history.

(56) References Cited

U.S. PATENT DOCUMENTS

| | | | | |
|---|---|---|---|---|
| 477,113 | A | * | 6/1892 | Gruneberg ............ F16C 19/163 16/DIG. 27 |
| 3,232,662 | A | * | 2/1966 | Graves ............... A47G 23/0608 297/240 |
| 4,117,627 | A | * | 10/1978 | Slingerland, Jr. ...... A47G 7/041 108/103 |
| 4,936,629 | A | * | 6/1990 | Young .................. B60N 2/2875 297/256.13 |
| 5,318,339 | A | * | 6/1994 | Cherniak ............... B60N 2/245 297/250.1 |

(Continued)

FOREIGN PATENT DOCUMENTS

CN      111657698 A   *  9/2020
KR   20100021715 A      2/2010

(Continued)

OTHER PUBLICATIONS

"360-Degree Swivel Cushion," Sharper Image, May 7, 2021, 3 pages.

(Continued)

*Primary Examiner* — Hilary L Gutman
(74) *Attorney, Agent, or Firm* — Christopher G. Darrow; Darrow Mustafa PC (57) ABSTRACT

An easy entrance/exit system for a vehicle includes a vehicle seat, a pad, a pad-side magnetic device, and a seat-side magnet. The vehicle seat includes a seat base. The pad is supported atop the seat base for swiveling about a pivot point. The pad-side magnetic device is coupled to the pad at the pivot point. The seat-side magnet is within the seat base at the pivot point. The seat-side magnet is configured to apply a magnetic field to the pad-side magnetic device to govern swiveling of the pad about the pivot point.

19 Claims, 3 Drawing Sheets

(56) References Cited

U.S. PATENT DOCUMENTS

| | | | | |
|---|---|---|---|---|
| 5,427,426 A * | 6/1995 | Grappo | ............ | B60N 2/14 |
| | | | | 297/212 |
| 6,015,188 A * | 1/2000 | Yundt | ............ | B60N 2/6054 |
| | | | | 297/344.21 |
| 6,997,512 B1 * | 2/2006 | Yu | ............ | A47C 3/18 |
| | | | | 297/344.21 |
| 7,159,940 B1 * | 1/2007 | Atkins | ............ | A47C 3/18 |
| | | | | 297/344.26 |
| 7,891,629 B2 * | 2/2011 | Moyers | ............ | A47C 3/18 |
| | | | | 297/344.21 |
| 10,292,497 B1 * | 5/2019 | Perkins | ............ | A47C 9/00 |
| 10,569,672 B1 * | 2/2020 | Kooker | ............ | B60N 2/885 |
| 10,857,907 B2 * | 12/2020 | Brodersen | ............ | A47C 3/18 |
| 11,389,001 B1 * | 7/2022 | Daily | ............ | A47C 3/18 |
| 2005/0104426 A1 * | 5/2005 | Yu | ............ | A47C 15/00 |
| | | | | 297/240 |
| 2009/0165336 A1 * | 7/2009 | Anderson | ............ | A43B 5/02 |
| | | | | 36/103 |
| 2016/0353895 A1 | 12/2016 | Lakshmi Narasimhan | | |
| 2017/0342737 A1 * | 11/2017 | Cooley | ............ | A45B 17/00 |
| 2020/0025424 A1 * | 1/2020 | Cauchy | ............ | H01L 35/30 |
| 2022/0000191 A1 * | 1/2022 | Cauchy | ............ | A47C 7/748 |

FOREIGN PATENT DOCUMENTS

| | | | | |
|---|---|---|---|---|
| KR | 20100110093 A | 10/2010 | | |
| KR | 102107236 B1 | 5/2020 | | |
| WO | WO-2007020526 A2 * | 2/2007 | ............ | B60N 2/5621 |

OTHER PUBLICATIONS

Karali et al., "An approach to vehicle design: In-depth audit to understand the needs of older drivers," Applied Ergonomics 58 (2017) 461-470.

* cited by examiner

EASY ENTRANCE/EXIT SYSTEM FOR A VEHICLE

TECHNICAL FIELD

The embodiments disclosed herein relate to vehicles and, more particularly, to an easy entrance/exit system for a vehicle.

BACKGROUND

Some vehicles are equipped with devices or systems for assisting elderly or disabled people to enter and exit the vehicle. For example, some passenger vehicles are equipped with vehicle seats that rotate away from and toward a door of the vehicle so that an occupant of the vehicle can enter and exit the vehicle seat. In another example, some busses are equipped with an adjustable suspension that lowers the floor of the bus so that an occupant can easily enter and exit the bus.

SUMMARY

Disclosed herein are embodiments of an easy entrance/exit system for a vehicle that includes a seat-side magnet within a seat base configured to govern swiveling of a pad supported atop the seat base by applying a magnetic field to a pad-side magnetic device coupled to the pad.

In one aspect, an easy entrance/exit system includes a vehicle seat, a pad, a pad-side magnetic device, and a seat-side magnet. The vehicle seat includes a seat base. The pad is supported atop the seat base for swiveling about a pivot point. The pad-side magnetic device is coupled to the pad at the pivot point. The seat-side magnet is within the seat base at the pivot point. The seat-side magnet is configured to apply a magnetic field to the pad-side magnetic device to govern swiveling of the pad about the pivot point.

In another aspect, an easy entrance/exit system includes a vehicle seat, a pad, a pad-side magnetic element, and a seat-side magnet. The vehicle seat includes a seat base. The pad is slidably resting on the seat base for swiveling about a pivot point. The pad-side magnetic element is integrated with the pad at the pivot point. The seat-side magnet is within the seat base at the pivot point. The seat-side magnet is configured to apply a magnetic field to the pad-side magnetic element to create a rotary coupling that mounts the pad to the seat base at the pivot point and allows swiveling of the pad about the pivot point.

In yet another aspect, an easy entrance/exit system includes a vehicle seat, a pad assembly, and a seat-side magnet. The vehicle seat includes a seat base. The pad assembly includes a baseplate non-slidably resting on the seat base, a pad atop the baseplate, and a rotary bearing mounted between the baseplate and the pad at a pivot point. The rotary bearing supports the pad atop the seat base for swiveling about the pivot point, and includes magnetorheological damping fluid. The seat-side magnet is within the seat base at the pivot point. The seat-side magnet is configured to apply a magnetic field to the magnetorheological dampening fluid to govern swiveling of the pad about the pivot point.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

In some instances, elderly or disabled people may have difficulty entering and exiting a vehicle. For example, an occupant sitting on a vehicle seat may have difficulty swiveling his or her body on a seat base as the occupant enters and/or exits the vehicle seat. Accordingly, this disclosure teaches an easy entrance/exit system for a vehicle. The easy entrance/exit system includes a vehicle seat, a pad, a pad-side magnetic device, and a seat-side magnet. The vehicle seat includes a seat base. The pad is supported atop the seat base for swiveling about a pivot point imparted by an occupant sitting on the pad as the occupant enters and/or exits the vehicle seat. The pad-side magnetic device is coupled to the pad at the pivot point. The seat-side magnet is within the seat base at the pivot point. The seat-side magnet is configured to apply a magnetic field to the pad-side magnetic device to govern swiveling of the pad about the pivot point.

A vehicle seat 10 is shown in FIGS. 1A-1B, 2A-2C, and 3. The vehicle seat 10 includes, among other components typical of vehicle seats, a seat base 12 and a seatback 14 arranged in a seating configuration (i.e., the seat base 12 has a horizontal orientation and the seatback 14 has an upright orientation). The vehicle seat 10 can also include seat base bolsters 16 along the seat base 12 and/or seatback bolsters 18 along the seatback 14. The vehicle seat 10 is part of a passenger vehicle. The vehicle can include an exterior and a number of interior compartments. The compartments can include a passenger compartment, an engine compartment, a cargo area and the like. Among other things, the vehicle can include a dash assembly, an instrument panel, controls, and the like housed in the passenger compartment. Additionally, the vehicle can include an engine, a motor, a transmission, and the like, as well as other powertrain components, such as wheels, housed in the engine compartment and elsewhere in the vehicle. The wheels can support the remainder of the vehicle on the ground. One, some or all of the wheels can be powered by the remainder of the powertrain components to drive the vehicle along the ground.

Each vehicle seat 10 of the vehicle can include an easy entrance/exit system 20. For brevity, this description follows with reference to an easy entrance/exit system 20 for one vehicle seat 10. By extension, this description follows with reference to the other vehicle seats 10 of the vehicle. In addition to the vehicle seat 10 and the seat base 12, the easy entrance/exit system 20 includes a pad 22, a pad-side magnetic device 24, and a seat-side magnet 26, as shown in FIGS. 1A-1B and 2A-2C. Each of these components will be described in turn in further detail below.

The pad 22 is supported atop the seat base 12 and is configured to support an occupant on the seat base 12. The pad 22 can have any suitable shape. For example, the pad 22 can be disk-shaped. As used herein, the term "disk-shaped" can include a substantially flattened circular, oval, polygonal, or square shape. The pad 22 can also be any suitable size. For example, the pad 22 can be substantially the same size as the seat base 12, as shown. The pad 22 can also be made of any suitable material(s). For example, the pad 22 can be made of fabric, such as a single-layer piece or sheet of fabric, a multi-layer piece or sheet of fabric, or two or more pieces or sheets of fabric layered on top of one another. In another example, the pad 22 can be made of a cushion, similar to the seat base 12, or can be two or more cushions stacked on each other. In another example, the pad 22 can be made of a plate, such as a rigid metal or polymeric plate, or two or more plates stacked on each other. The pad 22 can also be any combination of these materials, such as one or more fabric-covered cushions or plates, or one or more cushions stacked on top of one or more plates, or any other suitable combination.

The pad 22 is supported atop the seat base 12 for swiveling about a pivot point. The pivot point is substantially in the center of the seat base 12 (e.g., where an occupant would sit) when the pad 22 is installed with respect to the seat base 12. Accordingly, the pad 22 and the seat base 12 share the pivot point. The pad 22 can be configured to swivel about the pivot point as an occupant enters and/or exits the vehicle seat 10. The swiveling of the pad 22 about the pivot point is thus imparted by an occupant sitting on the pad 22. For example, an occupant sitting on the pad 22 can use his or her arms and/or legs to help swivel his or her body on the vehicle seat 10 by swiveling the pad 22 about the pivot point.

Figure 1A:
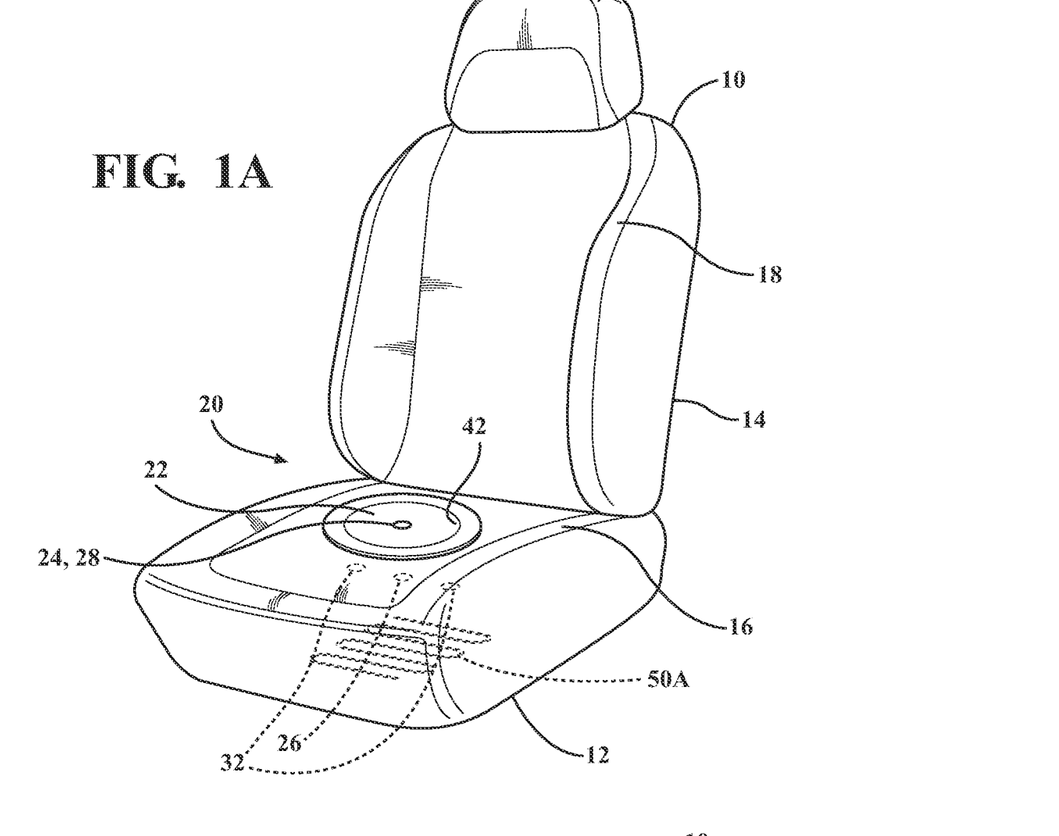
FIG. 1A is a perspective view of an example of an arrangement of an easy entrance/exit system for a vehicle.
Figure 1B:
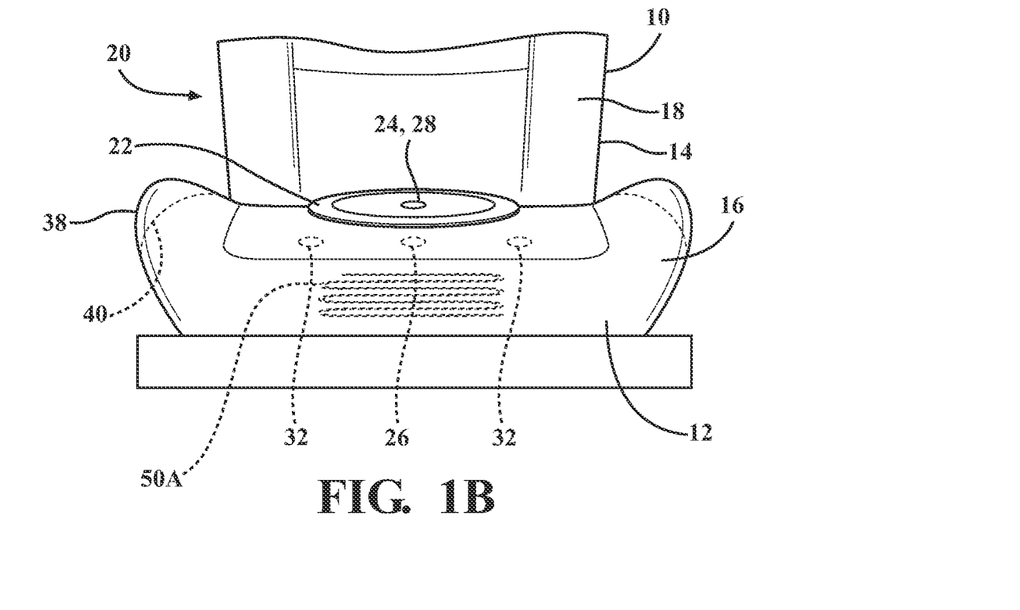
FIG. 1B is a front view of the arrangement of the easy entrance/exit system shown in FIG. 1A.
Figure 2A:
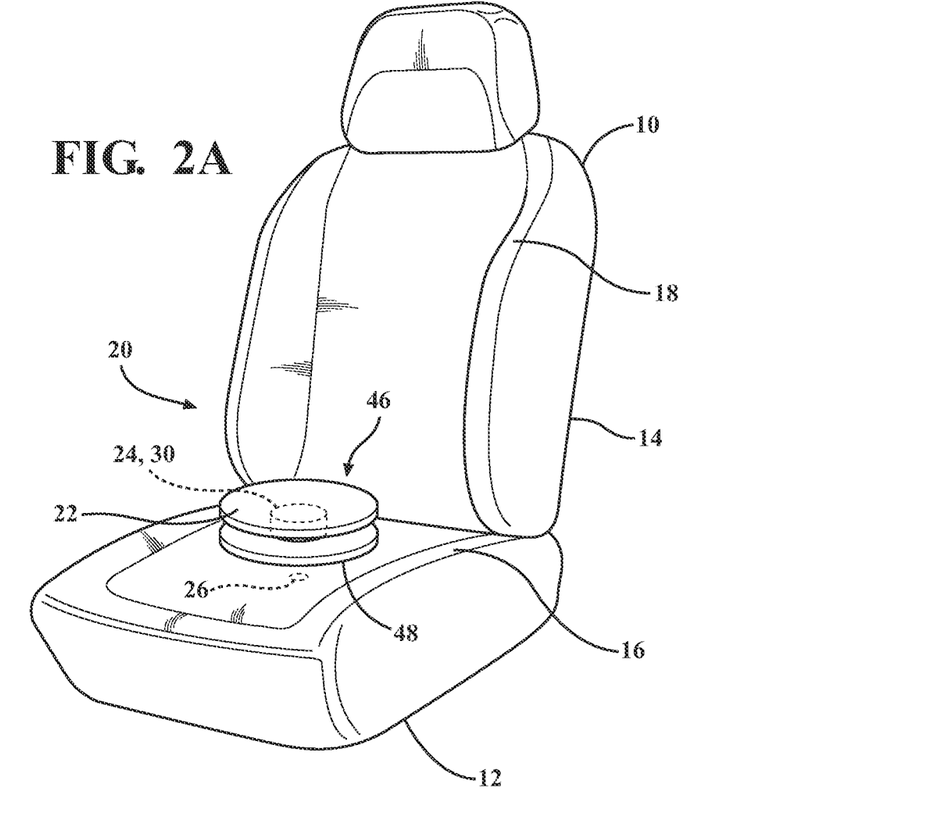
FIG. 2A is a perspective view an example of an arrangement of an easy entrance/exit system for a vehicle.
Figure 2B:
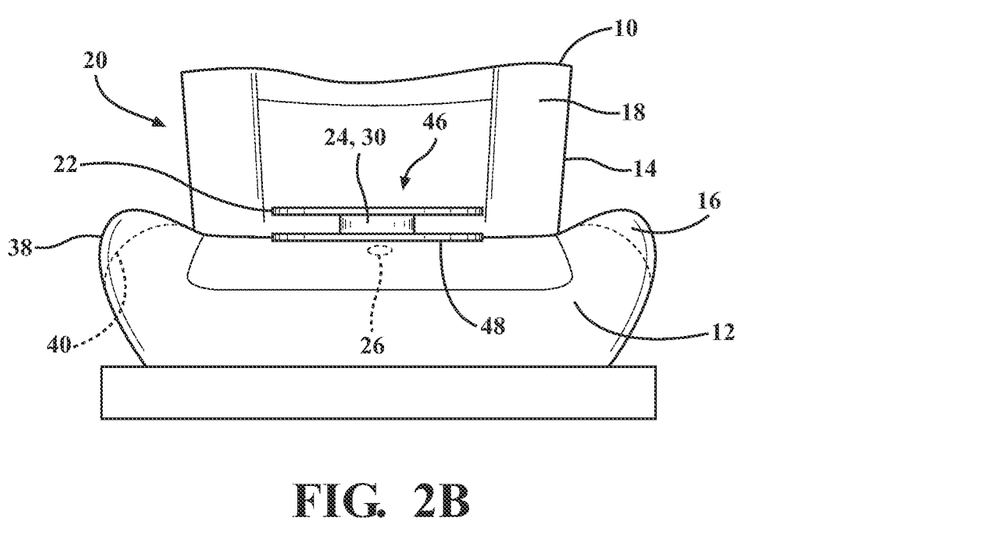
FIG. 2B is a front view of the arrangement of the easy entrance/exit system shown in FIG. 2A.
Figure 2C:
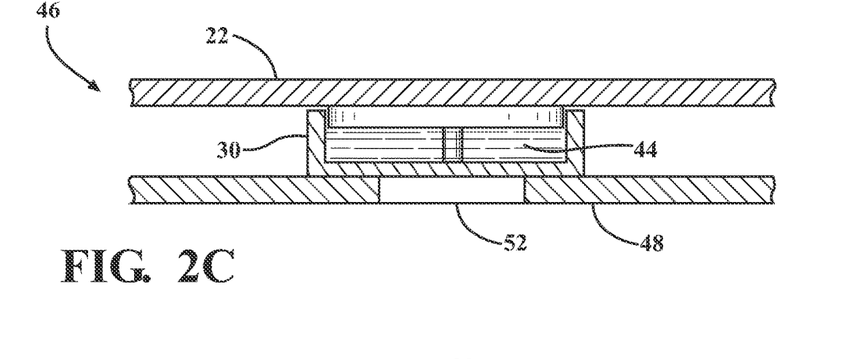
FIG. 2C is cross-sectional view of the arrangement of the easy entrance/exit system shown in FIGS. 2A and 2B, showing an example of a rotary bearing.

The pad-side magnetic device 24 is coupled to the pad 22 at the pivot point. In a first arrangement, as shown in FIGS. 1A and 1B, the pad-side magnetic device 24 is embodied by a pad-side magnetic element 28 integrated with the pad 22 at the pivot point. The pad-side magnetic element 28 can be attached to the pad 22. For example, the pad-side magnetic element 28 can be exteriorly attached to the underside or the topside of the pad 22, or the pad-side magnetic element 28 can be interiorly attached inside the pad 22. In a second arrangement, as shown in FIGS. 2A-2C, the pad-side magnetic device 24 is embodied by a rotary bearing 30 having magnetorheological (MR) damping fluid 44, to which the pad 22 is supportably mounted at the pivot point. These arrangements will be described in further detail below. In these and other arrangements, the pad-side magnetic device 24 may not be feelable or visible by an occupant sitting on the pad 22.

The seat-side magnet 26 is located within the seat base 12 at the pivot point. The seat-side magnet 26 is configured to apply a magnetic field to the pad-side magnetic device 24 to govern swiveling of the pad 22 about the pivot point. As used herein, the term "govern" includes creating a rotary coupling that allows swiveling of the pad 22 about the pivot point and/or promoting or attenuating swiveling of the pad 22 about the pivot point. In some arrangements, the seat-side magnet 26 is embodied by a permanent magnet that permanently generates a magnetic field. In some arrangements, the seat-side magnet 26 is embodied by an electromagnet that is selectively operable to generate a magnetic field. In a first arrangement, as shown in FIGS. 1A and 1B, the seat-side magnet 26 can be a first seat-side magnet 26 within the seat base 12 at the pivot point, and the easy entrance/exit system 20 can also include one or more second seat-side magnets 32 within the seat base 12 offset from the pivot point. The second seat-side magnet(s) 32 can be electromagnets, as described further below. In these and other arrangements, the seat-side magnet(s) 26, 32 may not be feelable or visible by an occupant sitting on the seat and/or the pad 22.

Figure 3:
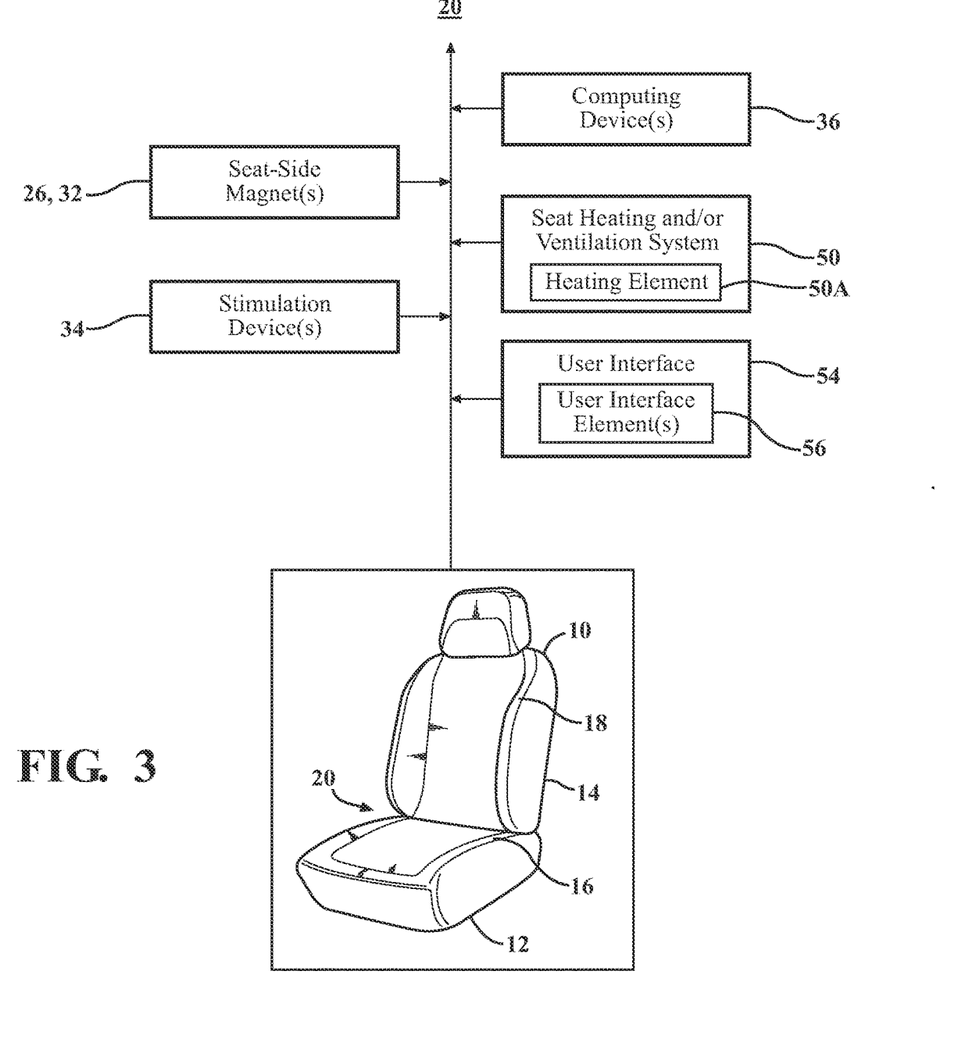
FIG. 3 is an example of various components of the easy entrance/exit system with respect to a vehicle.

In some arrangements, the easy entrance/exit system 20 can include one or more stimulation devices 34 and one or more computing devices 36, as shown in FIG. 3. Each of these components will be described in further detail below.

The stimulation device(s) 34 can be provided on the vehicle seat 10 in any suitable location. For example, the stimulation device(s) 34 can be located in the vehicle seat 10. The stimulation device(s) 34 can alternatively be located on the vehicle in any suitable location. In arrangements where the seat-side magnet(s) 26, 32 are electromagnets, the stimulation device(s) 34 are connected to the seat-side magnet(s) 26, 32 and the computing device(s) 36. In order to activate and deactivate the seat-side magnet(s) 26, 32, the stimulation device(s) 34 are operable to generate and apply the requisite stimuli to the seat-side magnet(s) 26, 32. Accordingly, the stimulation device(s) 34 may, for example, include an electrical energy device. Specifically, to activate the seat-side magnet(s) 26, 32, the stimulation device(s) 34 are operated to apply the requisite stimulus to the seat-side magnet(s) 26, 32, to which the seat-side magnet(s) 26, 32 are responsive to generate a magnetic field. Similarly, to deactivate the seat-side magnet(s) 26, 32, the stimulation device(s) 34 are operated to remove the requisite stimulus from the seat-side magnet(s) 26, 32, to which the seat-side magnet(s) 26, 32 are responsive to disable the magnetic field. Accordingly, it will be understood that operating the stimulation device(s) 34 to apply a requisite stimulus to the seat-side magnet(s) 26, 32 may include removing a previously-requisite and previously-applied stimulus.

The stimulation device(s) 34 can also be connected to the bolster(s) 16, 18. In particular, in some arrangements, the bolster(s) 16, 18 can be inflatable and deflatable to help an occupant enter and/or exit the vehicle seat 10 in conjunction with the easy entrance/exit system 20. FIGS. 1B and 2B depict the seat base bolsters 16 in an inflated configuration 38 and in a deflated configuration 40. In these arrangements, in order to inflate and deflate the bolster(s) 16, 18, the stimulation device(s) 34 can be operable to generate and apply the requisite stimuli to the bolster(s) 16, 18. Accordingly, the stimulation device(s) 34 may, for example, include any combination of an electrical energy generation device, an air generation device, and/or the like. Specifically to inflate the bolster(s) 16, 18, the stimulation device(s) 34 can be operated to apply the requisite stimulus to the bolster(s) 16, 18, to which the bolster(s) 16, 18 are responsive to inflate. Similarly, to deflate the bolster(s) 16, 18, the stimulation device(s) 34 can be operated to remove the requisite stimulus from the bolster(s) 16, 18, to which the bolster(s) 16, 18 are responsive to deflate. Accordingly, it will be understood that operating the stimulation device(s) 34 to apply a requisite stimulus to the bolster(s) 16, 18 may include removing a previously-requisite and previously-applied stimulus.

The computing device(s) 36 can be provided on the vehicle seat 10 in any suitable location. For example, the computing device(s) 36 can be located in the vehicle seat 10. The stimulation device(s) 34 can alternatively be located on the vehicle in any suitable location. The computing device(s) 36 are connected to the stimulation device(s) 34 and are configured to operate the stimulation device(s) 34 to activate and/or deactivate the seat-side magnet(s) 26, 32. For example, the computing device(s) 36 can selectively activate the seat-side magnet(s) 26, 32 to generate a magnetic field by operating the stimulation device to generate and apply the requisite stimuli to the seat-side magnet(s) 26, 32. Similarly, the computing device(s) 36 can selectively deactivate the stimulation device(s) 34 to disable the magnetic field by operating the stimulation device(s) 34 to remove the requisite stimuli to the seat-side magnet(s) 26, 32. The computing device(s) 36 can be dedicated to operating the seat-side magnet(s) 26, 32, or can additionally support the operation of other systems of the vehicle, for example, the bolster(s) 16, 18 and/or a seat heating and/or ventilation system 50 (shown in FIG. 3).

The computing device(s) 36 may include a processor communicatively coupled with a memory. The processor may include any device capable of executing machine-readable instructions, which may be stored on a non-transitory computer-readable medium, for example, the memory. The processor may include a controller, an integrated circuit, a microchip, a computer, and/or any other computing device(s) 36. The memory may include any type of computer readable medium suitable for storing data and algorithms. For example, the memory may include RAM, ROM, a flash memory, a hard drive, and/or any device capable of storing machine readable instructions. Various algorithms and data for operating the stimulation device(s) 34 may reside in whole or in part in the memory. The computing device(s) 36 may, for instance, have a module residing in memory for operating the stimulation devices to selectively activate and deactivate the seat-side magnet. The module may be configured to receive and analyze one or more signals from the computing device(s) 36.

The computing device(s) 36 can be configured to determine various actions, characteristics, and/or properties about the vehicle. For example, the computing device(s) 36 can determine when the vehicle is in park or drive, and/or when a door of the vehicle is open or closed. Based on these determinations, the computing device(s) 36 can send one or more signals to the module. The signal(s) can include a promotion signal and an attenuation signal. The promotion signal can be sent to the module when the computing device(s) 36 determine that the vehicle is in park and/or when a door of the vehicle is open. If the vehicle is in park and/or if a door of the vehicle is open, it is likely that an occupant is entering or exiting a vehicle seat 10. Therefore, the promotion signal can be generated, which can instruct the computing device(s) 36 to cause swiveling of the pad 22 about the pivot point to be promoted. Contrariwise, the attenuation signal can be sent to the module when the computing device(s) 36 determine that the vehicle is in drive and/or when the doors of the vehicle are closed. If the vehicle is in drive and/or the doors of the vehicle are closed, it is likely that there is no one entering or exiting a vehicle seat 10, and that swiveling of the pad 22 about the pivot point would be unsafe or not needed. Therefore, the attenuation signal can be generated, which can instruct the computing device(s) 36 to cause swiveling of the pad 22 about the pivot point to be attenuated. These signal(s) will be described in further detail below.

The easy entrance/exit system 20 can have any suitable arrangement of the previously mentioned components, including the pad 22, the pad-side magnet 24, the seat-side magnet(s) 26, 32, the stimulation device(s) 34, and/or the computing device(s) 36. Described herein are two arrangements of the easy entrance/exit system 20, however, it will be understood that the easy entrance/exit system 20 can have any other suitable arrangement. Each of the two arrangements will be described in further detail below.

The first arrangement of the easy entrance/exit system 20 is shown in FIGS. 1A and 1B. In this arrangement, the easy entrance/exit system 20 includes the vehicle seat 10, the seat base 12, the pad 22, the pad-side magnetic device 24 embodied by the pad-side magnetic element 28 integrated with the pad 22, and the seat-side magnet 26.

The pad 22 is configured to slidably rest on the seat base 12 for swiveling about the pivot point. Accordingly, the pad 22 can have a low-friction underside such that the pad 22 can swivel on the seat base 12. For example, the underside can be coated in Teflon or another low-friction material. The pad 22 can also have a high-friction topside to prevent the occupant from sliding off of the pad 22 when seated on the pad 22 and to prevent the occupant from sliding on the pad 22 when imparting swiveling to the pad 22. For example, the topside can be coated in fabric, as previously described, or another high-friction material. The pad-side magnetic element 28 can be made from any suitable magnetic material. In one example, the pad-side magnetic element 28 can be made from ferromagnetic material (e.g., iron or a material impregnated with iron). In other examples, the pad-side magnetic element 28 can be a permanent magnet (e.g., a ferromagnet).

The seat-side magnet 26 can be located in the seat base 12 at the pivot point in alignment with the pad-side magnetic element 28. With the pad 22 slidably resting on the seat base 12 for swiveling about the pivot point, the seat-side magnet 26 is configured to apply a magnetic field to the pad-side magnetic element 28. The pad-side magnetic element 28 and the seat-side magnet 26 are thus magnetically attracted to each other to create a rotary coupling that mounts the pad 22 to the seat base 12 at the pivot point and allows swiveling of the pad 22 about the pivot point. The seat-side magnet 26 can be any suitable magnet configured to generate a magnetic field. In one example, the seat-side magnet 26 can be a permanent magnet (e.g., a ferromagnet) configured to permanently apply a magnetic field. Alternatively, the seat-side magnet 26 can be an electromagnet that is selectively operable to generate a magnetic field. When the seat-side magnet 26 is activated, it generates a magnetic field applied to the pad-side magnetic element 28 to create a rotary coupling that mounts the pad 22 to the seat base 12 at the pivot point and allows swiveling of the pad 22 about the pivot point. The seat-side magnet 26 can be deactivated to unmount the pad 22 from the seat base 12.

Optionally, the pad-side magnetic element 28 can be a first pad-side magnetic element 28 integrated with the pad 22, and the pad-side magnetic device 24 can include a second pad-side magnetic element 42 integrated with the pad 22. While the first pad-side magnetic element 28 is integrated with the pad 22 at the pivot point, the second pad-side magnetic element 42 is integrated with the pad 22 offset from the pivot point. As shown, the second pad-side magnetic element 42 is a magnetic ring circumferentially offset from the pivot point. Similar to the first pad-side magnetic element 28, the second pad-side magnetic element 42 can be attached to the pad 22. For example, the second pad-side magnetic element 42 can be exteriorly attached to the underside or the topside of the pad 22, or the second pad-side magnetic element 42 can be interiorly attached inside the pad 22. The second pad-side magnetic element 42 can be made from any suitable magnetic material. In one example, the second pad-side magnetic element 42 can be made from ferromagnetic material (e.g., iron or a material impregnated with iron). In other examples, the second pad-side magnetic element 42 can be a permanent magnet (e.g., a ferromagnet).

Correspondingly, the seat-side magnet 26 can be a first seat-side magnet 26, and the easy entrance/exit system 20 can include the second seat-side magnet(s) 32 within the seat base 12 offset from the pivot point in alignment with the second pad-side magnetic element 42. The second seat-side magnet(s) 32 can be one or more electromagnets that are selectively operable to generate a magnetic field. The second seat-side magnet(s) 32 can be activated or deactivated to govern swiveling of the pad 22. For example, when activated, the second seat-side magnet(s) 32 generate a magnetic field applied to the second pad-side magnetic element 42. The second pad-side magnetic element 42 and the second seat-side magnet(s) 32 are thus magnetically attracted to each other to create a moment arm that attenuates swiveling of the pad 22 about the pivot point, and, furthermore, create a non-rotary coupling that further mounts the pad 22 to the seat base 12 offset from the pivot point. The second seat-side magnet(s) 32 can be deactivated to promote swiveling of the pad 22 about the pivot point and/or unmount the pad 22 from the seat base 12.

The second arrangement of the easy entrance/exit system 20 is shown in FIGS. 2A-2C. In this arrangement, the easy entrance/exit system 20 includes the vehicle seat 10, the seat base 12, the pad 22, the pad-side magnetic device 24 embodied by a rotary bearing 30 having MR damping fluid 44, to which the pad 22 is supportably mounted at the pivot point, and the seat-side magnet 26 embodied by an electromagnet that is selectively operable to generate a magnetic field.

The pad 22 is a part of a pad assembly 46. The pad assembly 46 includes a baseplate 48, the pad 22, and the rotary bearing 30. The baseplate 48 is configured to non-slidably rest on the seat base 12. The pad 22 is located atop the baseplate 48. The rotary bearing 30 is mounted between the baseplate 48 and the pad 22 at the pivot point. Accordingly, the rotary bearing 30 supports the pad 22 atop the seat base 12 for swiveling about the pivot point.

The seat-side magnet 26 can be located in the seat base 12 at the pivot point in alignment with the rotary bearing 30. As noted above, the rotary bearing 30 includes the MR damping fluid 44. By changing the flow resistance (e.g., viscosity, stiffness, etc.) of the MR damping fluid 44, the rotary bearing 30 can attenuate and/or promote swiveling of the pad 22 about the pivot point. In order to change the flow resistance of the MR damping fluid 44, the seat-side magnet 26 can be an electromagnet, as mentioned above. The seat-side magnet 26 is selectively operable to generate a magnetic field, which is applied to the rotary bearing 30, including the MR damping fluid 44. When the seat-side magnet 26 is activated to generate the magnetic field, the flow resistance of the MR damping fluid 44 increases. Thus, swiveling of the pad 22 about the pivot point is attenuated when the seat-side magnet 26 is activated. When the seat-side magnet 26 is deactivated to disable the magnetic field, the flow resistance of the MR damping fluid 44 decreases. Thus, swiveling of the pad 22 about the pivot point is promoted when the seat-side magnet 26 is deactivated.

Alternatively, as shown in FIG. 2C, the second arrangement of the easy entrance and exit system 20 can further include an MR damping fluid magnet 52. Similar to the seat-side magnet 26, the MR damping fluid magnet 52 can be located at the pivot point in alignment with the rotary bearing 30. As shown, the MR damping fluid magnet 52 can be a part of the pad assembly 46. For example, the MR damping fluid magnet 52 can be integrated with the baseplate 48, integrated with the rotary bearing 30, or integrated with the pad 22. Alternatively, the MR damping fluid magnet 52 can be located in the seat base 12 at the pivot point. For example, the MR damping fluid magnet 52 can be integrated with the seat-side magnet 26. The MR damping fluid magnet 52 can be a permanent magnet (e.g., a ferromagnet) configured to permanently apply a magnetic field to the rotary bearing 30, including the MR damping fluid 44. Unless the magnetic field applied by the MR damping fluid magnet 52 is canceled out, the flow resistance of the MR damping fluid 44 increases.

As noted above, the seat-side magnet 26 is selectively operable to generate a magnetic field, which is applied to the rotary bearing 30, including the MR damping fluid 44. The seat-side magnet 26 can be activated to generate a magnetic field that cancels out the magnetic field applied by the MR damping fluid magnet 52. When the seat-side magnet 26 is deactivated to disable the magnetic field, the magnetic field applied by the MR damping fluid magnet 52 is not canceled out, and the flow resistance of the MR damping fluid 44 increases. Thus, swiveling of the pad 22 about the pivot point is attenuated when the seat-side magnet 26 is deactivated. When the seat-side magnet 26 is activated to generate the magnetic field, the magnetic field applied by the MR damping fluid magnet 52 is canceled out, and the flow resistance of the MR damping fluid 44 decreases. Thus, swiveling of the pad 22 about the pivot point is promoted when the seat-side magnet 26 is activated.

In the above-described and other arrangements, the easy entrance/exit system 20 can be used in addition to other systems typical of vehicle seats. For example, as shown in FIG. 3, the vehicle seat 10 can include a heating and/or ventilation system 50, as mentioned above. The heating and/or ventilation system 50 can be a typical heating and/or ventilation system 50 for vehicle seats 10 that is configured to heat and/or cool the vehicle seat 10. In these examples, the easy entrance/exit system 20 does not substantially interfere with the heating and/or ventilation system 50. For example, the heating and/or ventilation system 50 can include a heating element 50A located within the seat base 12 under the seat-side magnet(s) 26 to heat the seat. The heating element 50A can be a heating coil or any other suitable heating element. Additionally or alternatively, the heating and/or ventilation system 50 can include a cooling element 50B located within the seat base 12 under the seat-side magnet(s) 26 to cool the seat. The cooling element 50B can be a fan or any other suitable cooling element. The seat base 12 can also include ventilation holes 50C to allow heated or cooled air to pass through. Moreover, in the first arrangement of the easy entrance/exit system 20, the pad 22 can include a heating element, a cooling element, and/or ventilation holes 50A. Similarly, in the second arrangement of the easy entrance/exit system 20, the pad 22 and the baseplate 48 can include a heating element, a cooling element, ventilation holes 58 for the pad 22 and/or ventilation holes 60 for the baseplate 48.

Referring once again to FIGS. 1A and 1B, the first arrangement of the easy entrance/exit system 20 operates in the following manner. The first seat-side magnet 26 applies a magnetic field to the pad-side magnetic element 28 to create a rotary coupling that mounts the pad 22 to the seat base 12 at the pivot point and allows swiveling of the pad 22 about the pivot point. For example, in arrangements where the first seat-side magnet 26 is an electromagnet, the computing device(s) 36 can be configured to cause the first seat-side magnet 26 to be activated. For example, the computing device(s) 36 can cause the stimulation device(s) 34 to apply the requisite stimulus to the first seat-side magnet 26. When the computing device(s) 36 receive the attenuation signal, for example, when the vehicle is in drive or the doors of the vehicle are closed, the computing device(s) 36 can be configured to cause the second seat-side magnet(s) 32 to be activated. For example, the computing device(s) 36 can cause the stimulation device(s) 34 to apply the requisite stimulus to the second seat-side magnet(s) 32. This will cause the second seat-side magnet(s) 32 to generate a magnetic field, creating a moment arm that attenuates swiveling of the pad 22 about the pivot point. When the computing device(s) 36 receive the promotion signal, the computing device(s) 36 can be configured to cause the second seat-side magnet(s) 32 to be deactivated. For example, the computing device(s) 36 can cause the stimulation device(s) 34 to disable the requisite stimulus applied to the second seat-side magnet(s) 32. This will cause the second seat-side magnet(s) 32 to cease generation of the magnetic field, and will promote swiveling of the pad 22 about the pivot point.

Referring once again to FIGS. 2A-2C, the second arrangement of the easy entrance/exit system 20 operates in the following manner. When the computing device(s) 36 receive the attenuation signal, the computing device(s) 36 can be configured to cause the seat-side magnet 26 to be activated. For example, the computing device(s) 36 can cause the stimulation device(s) 34 to apply the requisite stimulus to the seat-side magnet 26. This will cause the seat-side magnet 26 to generate a magnetic field which is applied to the MR fluid 44 in the rotary bearing 30. As a result, the flow resistance of the MR fluid 44 increases, and swiveling of the pad 22 is attenuated. When the computing device(s) 36 receive the promotion signal, the computing device(s) 36 can be configured to cause the seat-side magnet 26 to be deactivated. For example, the computing device(s) 36 can cause the stimulation device(s) 34 to disable the requisite stimulus applied to the seat-side magnet 26. This will cause the flow resistance of the MR fluid 44 to decrease and swiveling of the pad 22 to be promoted.

In the alternative second arrangement of the easy entrance and exit system 20 that includes the MR damping fluid magnet 52 that applies a magnetic field to the MR fluid 44 in the rotary bearing 30, when the computing device(s) 36 receive the attenuation signal, the computing device(s) 36 can be configured to cause the seat-side magnet 26 to be deactivated. For example, the computing device(s) 36 can cause the stimulation device(s) 34 to disable the requisite stimulus applied to the seat-side magnet 26. This will cause the magnetic field applied by the MR damping fluid magnet 52 to be not canceled out. As a result, the flow resistance of the MR fluid 44 increases, and swiveling of the pad 22 is attenuated. When the computing device(s) 36 receive the promotion signal, the computing device(s) 36 can be configured to cause the seat-side magnet 26 to be activated. For example, the computing device(s) 36 can cause the stimulation device(s) 34 to apply the requisite stimulus to the seat-side magnet 26. This will cause the seat-side magnet 26 to generate a magnetic field which is applied to the MR fluid 44 in the rotary bearing 30 that cancels out the magnetic field applied by the MR damping fluid magnet 52. As a result, the flow resistance of the MR fluid 44 decreases, and swiveling of the pad 22 is promoted.

In the previously-described and other arrangements of the easy entrance/exit system 20, the computing device(s) 36 can be configured to cause the bolster(s) 16, 18 to be inflated or deflated upon receiving the signals. For example, when the computing device(s) 36 receive the attenuation signal, the computing device(s) 36 can be configured to cause the bolster(s) 16, 18 to be inflated. For example, the computing device(s) 36 can cause the stimulation device(s) 34 to apply the requisite stimulus to the bolster(s) 16, 18. When the computing device(s) 36 receive the promotion signal, the computing device(s) 36 can be configured to cause the bolster(s) 16, 18 to be deflated. For example, the computing device(s) 36 can cause the stimulation device(s) 34 to disable the requisite stimulus applied to the bolster(s) 16, 18.

Moreover, swiveling of the pad 22 about the pivot point can be controlled by the occupant of the vehicle through a user interface 54 of the vehicle. Referring to FIG. 3, the user interface 54 can include user interface element(s) 56 that when selected by the occupant are configured to send the attenuation signal or the promotion signal to the computing device(s) 36. The user interface element(s) 56 can be one or more buttons, switches, levers, and/or any other suitable user interface element(s) 56. For example, the user interface element(s) 56 can include an easy entrance/exit system 20 activation button and an easy entrance/exit system 20 deactivation button. When the activation button is selected by an occupant of the vehicle, the computing device(s) 36 can be configured to send the promotion signal to the module, thereby promoting swiveling of the pad 22 about the pivot point. Similarly, when the deactivation button is selected by an occupant of the vehicle, the computing device(s) 36 can be configured to send the attenuation signal to the module, thereby attenuating swiveling of the pad 22 about the pivot point.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An easy entrance/exit system for a vehicle, comprising:
    a vehicle seat, the vehicle seat including a seat base;
    a pad, the pad supported atop the seat base for swiveling about a pivot point;
    a pad-side magnetic device coupled to the pad at the pivot point; and
    a seat-side magnet within the seat base at the pivot point, the seat-side magnet configured to apply a magnetic field to the pad-side magnetic device to govern swiveling of the pad about the pivot point.

2. The easy entrance/exit system of claim 1, wherein the pad includes at least one of a sheet of fabric, a cushion, and a plate.

3. The easy entrance/exit system of claim 1, wherein the seat-side magnet is not visible or feelable by an occupant.

4. The easy entrance/exit system of claim 1, further comprising:
    a bolster on the vehicle seat, wherein the bolster is configured to deflate when an occupant is entering or exiting the vehicle.

5. An easy entrance/exit system for a vehicle, comprising:
    a vehicle seat, the vehicle seat including a seat base;
    a pad, the pad slidably resting on the seat base for swiveling about a pivot point;
    a pad-side magnetic element integrated with the pad at the pivot point; and
    a seat-side magnet within the seat base at the pivot point, the seat-side magnet configured to apply a magnetic field to the pad-side magnetic element to create a rotary coupling that mounts the pad to the seat base at the pivot point and allows swiveling of the pad about the pivot point.

6. The easy entrance/exit system of claim 5, wherein the pad includes a low-friction underside and a high-friction topside.

7. The easy entrance/exit system of claim 5, wherein the seat-side magnet is a permanent magnet configured to permanently apply a magnetic field to the pad-side magnet to create a rotary coupling that mounts the pad to the seat base at the pivot point and allows swiveling of the pad about the pivot point.

8. The easy entrance/exit system of claim 5, wherein the pad-side magnetic element is a first pad-side magnetic element, and wherein the seat-side magnet is a first seat-side magnet, and further comprising:
   a second pad-side magnetic element integrated with the pad offset from the pivot point; and
   a second seat-side magnet within the seat base offset from the pivot point, wherein the second seat-side magnet is configured to apply a magnetic field to second pad-side magnetic element to create a moment arm that attenuates swiveling of the pad about the pivot point.

9. The easy entrance/exit system of claim 8, wherein the first seat-side magnet is an electromagnet that is selectively operable to apply a magnetic field to the second pad-side magnetic element, wherein the second seat-side magnet is an electromagnet that is selectively operable to apply a magnetic field to the second pad-side magnetic element, wherein activation of the first seat-side magnet and activation of the second seat-side magnet attenuates swiveling of the pad about the pivot point and wherein activation of the first seat-side magnet and deactivation of the second seat-side magnet promotes swiveling of the pad about the pivot point.

10. The easy entrance/exit system of claim 9, further comprising:
    at least one computing device connected to the second seat-side magnet, the at least one computing device configured to receive an attenuation signal, and, responsive to receiving the attenuation signal, activate the second seat-side magnet to attenuate swiveling of the pad about the pivot point.

11. The easy entrance/exit system of claim 10, wherein the attenuation signal is indicative of at least one of the vehicle being in drive and doors of the vehicle being closed.

12. The easy entrance/exit system of claim 9, further comprising:
    at least one computing device connected to the second seat-side magnet, the at least one computing device configured to receive a promotion signal, and, responsive to receiving the promotion signal, deactivate the second seat-side magnet to promote swiveling of the pad about the pivot point.

13. The easy entrance/exit system of claim 12, wherein the promotion signal is indicative of at least one of the vehicle being in park and at least one door of the vehicle being open.

14. An easy entrance/exit system for a vehicle, comprising:
    a vehicle seat, the vehicle seat including a seat base;
    a pad assembly, the pad assembly including a baseplate non-slidably resting on the seat base, a pad atop the baseplate, and a rotary bearing mounted between the baseplate and the pad at a pivot point, the rotary bearing supporting the pad atop the seat base for swiveling about the pivot point, and including magnetorheological damping fluid; and
    a seat-side magnet within the seat base at the pivot point, the seat-side magnet configured to apply a magnetic field to the magnetorheological damping fluid to govern swiveling of the pad about the pivot point.

15. The easy entrance/exit system of claim 14, wherein the seat-side magnet is an electromagnet selectively operable to apply a magnetic field to the rotary bearing, and wherein operation of the seat-side magnet changes the flow resistance of the magnetorheological damping fluid, thereby governing swiveling of the pad about the pivot.

16. The easy entrance/exit system of claim 15, further comprising:
    at least one computing device connected to the seat-side magnet, the at least one computing device configured to receive an attenuation signal, and, responsive to receiving the attenuation signal, operate the seat-side magnet to attenuate swiveling of the pad about the pivot point.

17. The easy entrance/exit system of claim 16, wherein the attenuation signal is indicative of at least one of the vehicle being in drive and doors of the vehicle being closed.

18. The easy entrance/exit system of claim 15, further comprising:
    at least one computing device connected to the seat-side magnet, the at least one computing device configured to receive a promotion signal, and, responsive to receiving the promotion signal, operate the seat-side magnet to promote swiveling of the pad about the pivot point.

19. The easy entrance/exit system of claim 18, wherein the promotion signal is indicative of at least one of the vehicle being in park and at least one door of the vehicle being open.

* * * * *

UNITED STATES PATENT AND TRADEMARK OFFICE
CERTIFICATE OF CORRECTION

PATENT NO. : 11,654,800 B2
APPLICATION NO. : 17/333108
DATED : May 23, 2023
INVENTOR(S) : Daniel J. Brooks, Manuel Ludwig Kuehner and Jaime Camhi It is certified that error appears in the above-identified patent and that said Letters Patent is hereby corrected as shown below:

In the Claims

Claim 15, Column 12, Line 26: replace "pivot" with --pivot point--

Signed and Sealed this
Eighteenth Day of July, 2023

Katherine Kelly Vidal
*Director of the United States Patent and Trademark Office*